United States Patent
Jeong et al.

(10) Patent No.: US 8,711,588 B1
(45) Date of Patent: Apr. 29, 2014

(54) POWER SUPPLY DEVICE

(71) Applicant: Samsung Electro-Mechanics Co., Ltd., Gyunggi-do (KR)

(72) Inventors: In Wha Jeong, Gyunggi-do (KR); Bum Seok Suh, Gyunggi-do (KR); Hyo Jin Lee, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/838,381

(22) Filed: Mar. 15, 2013

(30) Foreign Application Priority Data

Dec. 20, 2012 (KR) ........................ 10-2012-0149350

(51) Int. Cl.
*H02J 1/10* (2006.01)

(52) U.S. Cl.
USPC .................................. 363/65; 363/16; 363/71

(58) Field of Classification Search
USPC .................... 363/16, 21.12, 63, 64, 65, 71, 72
See application file for complete search history.

(56) References Cited

U.S. PATENT DOCUMENTS

| | | | |
|---|---|---|---|
| 8,213,188 B2 * | 7/2012 | Tada et al. | 363/16 |
| 2008/0278980 A1 * | 11/2008 | Lu | 363/71 |
| 2012/0044729 A1 | 2/2012 | Coleman et al. | |
| 2012/0087163 A1 * | 4/2012 | Morimoto et al. | 363/71 |

FOREIGN PATENT DOCUMENTS

| | | |
|---|---|---|
| JP | 2007-527687 A | 4/2005 |
| WO | 2005/033819 A2 | 4/2005 |

\* cited by examiner

*Primary Examiner* — Nguyen Tran
(74) *Attorney, Agent, or Firm* — McDermott Will & Emery LLP

(57) ABSTRACT

There is provided a power supply device including an alternating current (AC) power supply unit supplying a first primary current in a positive half cycle and supplying a second primary current in a negative half cycle; a transformer unit including a first transformer and a second transformer; a main switch unit including a first main switch and a second main switch; an auxiliary switch unit including a first auxiliary switch and a second auxiliary switch; an auxiliary inductor unit including a first auxiliary inductor and a second auxiliary inductor; and a path providing unit providing a conduction path based on power supplied from the AC power supply unit.

20 Claims, 8 Drawing Sheets

POWER SUPPLY DEVICE

CROSS-REFERENCE TO RELATED APPLICATIONS

This application claims the priority of Korean Patent Application No. 10-2012-0149350 filed on Dec. 20, 2012, in the Korean Intellectual Property Office, the disclosure of which is incorporated herein by reference.

BACKGROUND OF THE INVENTION

1. Field of the Invention

The present invention relates to a power supply device for reducing switching loss.

2. Description of the Related Art

Recently, active power factor correction technologies, necessarily used in an alternating current (AC)-direct current (DC) power supply device having high capacity have come to prominence in connection with improvements of the stability and power quality of power supply devices. In addition, various topologies and control technologies have been grafted onto active power factor correction technologies.

A boost power factor correction (PFC) circuit including one inductor, one power semiconductor switch, and one diode, has been most commonly used in an active power factor correction field. However, it may be difficult to apply the boost PFC circuit to an AC-DC power supply device having a high capacity of 1 kW or more, due to relatively low efficiency, high levels of voltage ripple, and electro-magnetic interference (EMI) noise.

In order to address the defect of such a general boost PFC circuit and to apply the boost PFC circuit to an AC-DC power supply device having high capacity, a bridgeless boost PFC converter has been suggested.

A bridgeless boost PFC converter does not use a rectifier on an input terminal, thereby reducing costs for the implementation of the PFC circuit. In addition, a bridgeless boost PFC converter may increase efficiency by removing conduction loss that may be generated in a bridge rectifier.

However, a bridgeless boost PFC converter may have a high conducted common mode EMI noise level due to high input ripple current and switching of PFC switch parasitic capacitance connected to the ground. Accordingly, the bridgeless boost PFC converter requires a very large EMI filter, which increases costs of the bridgeless boost PFC converter and reduces power density of the converter.

In particular, conventionally, in order to implement an isolated AC-DC power supply device, a two-stage configuration formed by connecting a non-isolated bridgeless boost PFC converter and an isolated DC-DC converter is used. However, the two-stage configuration may increase costs and power loss due to the two-stage configuration. In order to address the defect, research into various isolated AC-DC converters having single-stage structures has been conducted.

RELATED ART DOCUMENT (Patent Document 1) Japanese Patent Laid-open Publication No. 2007-527687

SUMMARY OF THE INVENTION

An aspect of the present invention provides a power supply device capable of transferring surplus power to the ground prior to switching for power conversion, thereby reducing switching loss generated during switching.

Another aspect of the present invention provides a power supply device capable of reducing an electro-magnetic interference (EMI) noise level.

According to an aspect of the present invention, there is provided a power supply device including: an alternating current (AC) power supply unit supplying a first primary current in a positive half cycle and supplying a second primary current in a negative half cycle; a transformer unit including a first transformer transforming the first primary current from the AC power supply unit into a first secondary current, and a second transformer transforming the second primary current from the AC power supply unit into a second secondary current; a main switch unit including a first main switch controlling the first primary current flowing through a primary winding of the first transformer, and a second main switch controlling the second primary current flowing through a primary winding of the second transformer; an auxiliary switch unit including a first auxiliary switch forming a transfer path for surplus power present before the first main switch is turned on, and a second auxiliary switch forming a transfer path for surplus power present before the second main switch is turned on; an auxiliary inductor unit including a first auxiliary inductor adjusting an amount of current flowing through the first auxiliary switch during a switching operation of the first auxiliary switch, and a second auxiliary inductor adjusting an amount of current flowing through the second auxiliary switch during a switching operation of the second auxiliary switch; and a path providing unit providing a conduction path based on power supplied from the AC power supply unit.

The path providing unit may include a first path diode turned on during the positive half cycle; and a second path diode turned on during the negative half cycle.

The first path diode may be formed between the first main switch and a negative terminal of the AC power supply unit, and the second path diode may be formed between the second main switch and a positive terminal of the AC power supply unit.

The power supply device may further include a first rectifier diode rectifying and outputting the first secondary current of the first transformer; and a second rectifier diode rectifying and outputting the second secondary current of the second transformer.

The power supply device may further include a capacitor element stabilizing power transferred from the first rectifier diode and the second rectifier diode.

The first auxiliary switch is turned on before the first main switch is turned on, and the first auxiliary switch is turned off before the first main switch is turned off so as to perform a first switching operation.

The second auxiliary switch may be turned on before the second main switch is turned on, and the second auxiliary switch may be turned off before the second main switch is turned off so as to perform a second switching operation.

The first main switch and second main switch of the main switch unit may perform switching operations with an input phase difference of 180°.

The first auxiliary inductor and the primary winding of the first transformer may be inductively coupled to each other, and the second auxiliary inductor and the primary winding of the second transformer may be inductively coupled to each other.

The power supply device may further include a magnetic core shared by the first auxiliary inductor and the first transformer.

According to another aspect of the present invention, there is provided a power supply device including: an alternating current (AC) power supply unit supplying a first primary current in a positive half cycle and supplying a second primary current in a negative half cycle; a first transformer connected between a positive terminal of the AC power supply unit and transforming the first primary current from the AC power supply unit into a first secondary current; a second transformer connected to a negative terminal of the AC power supply unit and transforming the second primary current from the AC power supply unit into a second secondary current; a first main switch controlling the first primary current flowing through a primary winding of the first transformer; a second main switch performing a switching operation with a predetermined phase difference with the first main switch and controlling the second primary current flowing through a primary winding of the second transformer; an auxiliary switch unit including a first auxiliary switch forming a transfer path for surplus power present before the first main switch is turned on, and a second auxiliary switch forming a transfer path for surplus power present before the second main switch is turned on; an auxiliary inductor unit including a first auxiliary inductor adjusting an amount of current flowing through the first auxiliary switch during a switching operation of the first auxiliary switch, and a second auxiliary inductor adjusting an amount of current flowing through the second auxiliary switch during a switching operation of the second auxiliary switch; and a path providing unit providing a conduction path based on power supplied from the AC power supply unit.

The path providing unit may include a first path diode turned on during the positive half cycle; and a second path diode turned on during the negative half cycle.

The first path diode may be formed between the first main switch and a negative terminal of the AC power supply unit, and the second path diode may be formed between the second main switch and a positive terminal of the AC power supply unit.

The power supply device may further include a first rectifier diode rectifying and outputting the first secondary current of the first transformer; and a second rectifier diode rectifying and outputting the second secondary current of the second transformer.

The power supply device may further include a capacitor element stabilizing power transferred from the first rectifier diode and the second rectifier diode.

The first auxiliary switch is turned on before the first main switch is turned on, and the first auxiliary switch is turned off before the first main switch is turned off so as to perform a first switching operation.

The second auxiliary switch may be turned on before the second main switch is turned on, and the second auxiliary switch may be turned off before the second main switch is turned off so as to perform a second switching operation.

The first main switch and second main switch of the main switch unit may perform switching operations with an input phase difference of 180°.

The first auxiliary inductor and the primary winding of the first transformer may be inductively coupled to each other, and the second auxiliary inductor and the primary winding of the second transformer may be inductively coupled to each other.

The power supply device may further include a magnetic core shared by the first auxiliary inductor and the first transformer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
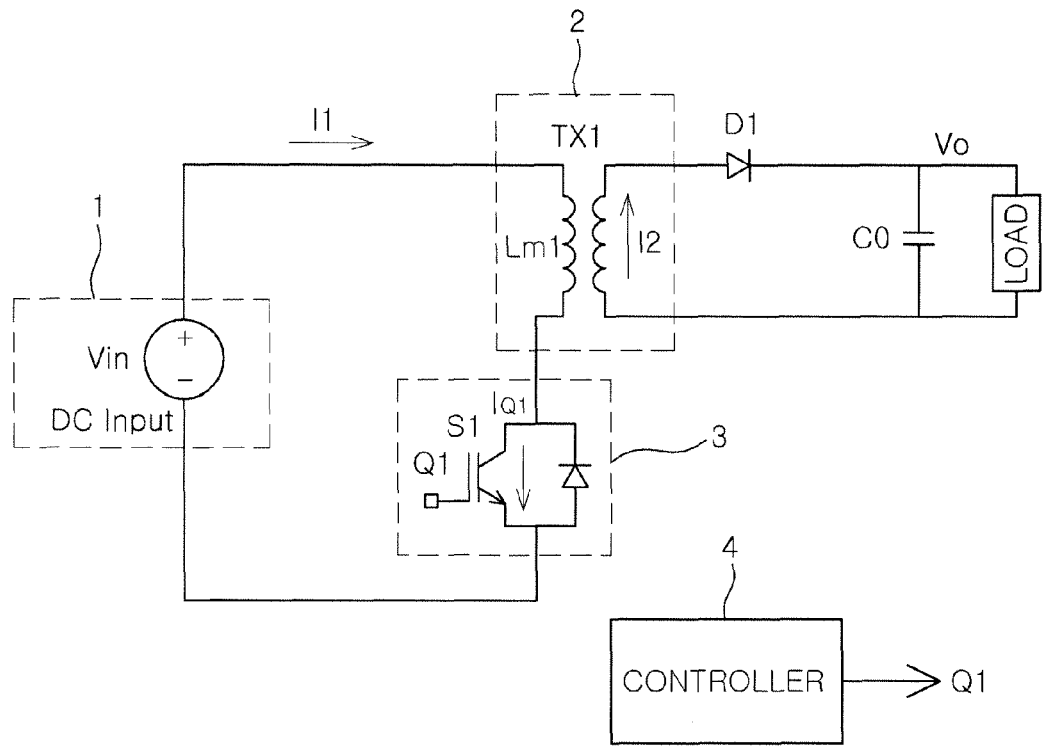
FIG. 1 is a circuit diagram of an isolated flyback converter.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a circuit diagram of an isolated flyback converter.

Referring to FIG. 1, the isolated flyback converter may include a power input unit 1, a transformer 2, a switching element 3, a controller 4, and a rectifier diode D1.

The power input unit 1 may supply input power.

The transformer 2 may transform a primary current I1 from the power input unit 1 into a secondary current I2.

The switching element 3 may control the primary current I1 flowing a primary winding of the transformer 2.

The controller 4 may apply a driving signal Q1 for driving the switching element 3.

The rectifier diode D1 may rectify the secondary current I2 of the transformer 2.

A capacitor element $C_O$ may stabilize power transferred from the rectifier diode D1.

In order for the isolated flyback converter to transfer energy of a primary side of the transformer 2 to a secondary side of the transformer 2, the switching element 3 may perform a switching operation.

In this case, switching loss may be generated due to the switching operation of the switching element 3. In addition, a high degree of stress may be generated in the switching element 3.

In order to ensure zero voltage switching (ZVS) of the switching element 3, energy stored in leakage inductance of an insulated transformer needs to be higher than energy stored in parasitic capacitance of both ends of the switching element 3. Thus, in order to ensure ZVS of the switching element 3, an insulated transformer having a high degree of leakage inductance is generally used.

However, when leakage inductance of an isolated converter is increased, high levels of voltage and current stress are generated in the switching element 3 and the rectifier diode D1, and correspondingly, additional loss may be generated. In addition, in order to ensure a margin for the voltage and current stress, a switching element and an output rectifier diode, which have high rated capacity need to be used, thereby increasing costs of the flyback converter.

Figure 2:
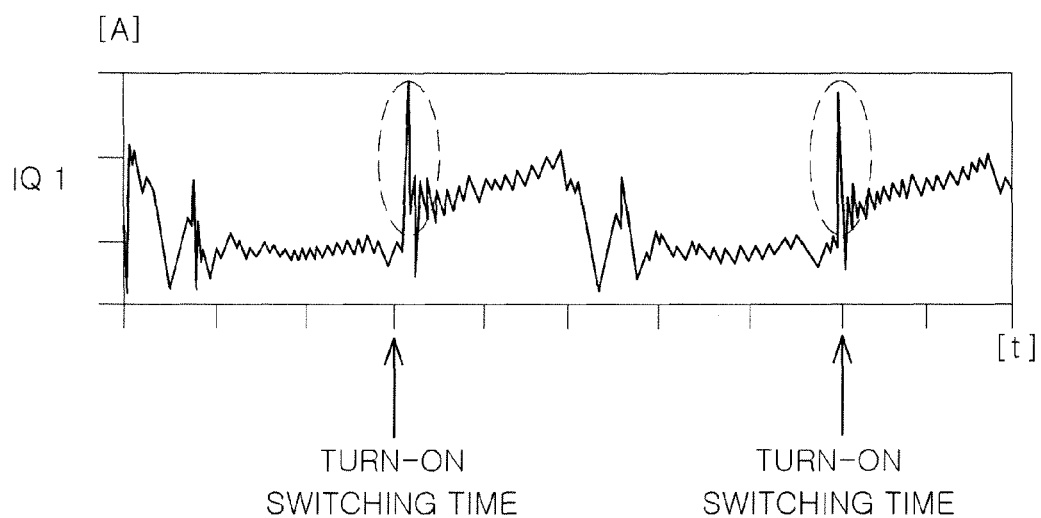
FIG. 2 is a waveform diagram of a current flowing through a switching element of the isolated flyback converter.

FIG. 2 is a waveform diagram of a current flowing through a switching element of the isolated flyback converter.

Referring to FIG. 2, a current IQ1 flowing in the switching element over time may be shown. In this case, it may be seen that a large amount of current is generated at a turn-on time of switching. The large amount of current increases switching loss and stress of the switching element.

Such a current spike, generated due to leakage inductance of an insulated transformer and a reverse recovery current of an output rectifier diode may increase an electro-magnetic interference (EMI) noise level of the flyback converter, thereby increasing the costs and size of an EMI filter.

The isolated flyback converter uses direct current (DC) input power. Thus, when the isolated flyback converter uses alternating current (AC) input power, the isolated flyback converter requires an AC-DC converter or a diode rectifier without a PFC function at a front end thereof. In this case, since an additional converter circuit is used, costs and converter loss may be increased.

Figure 3:
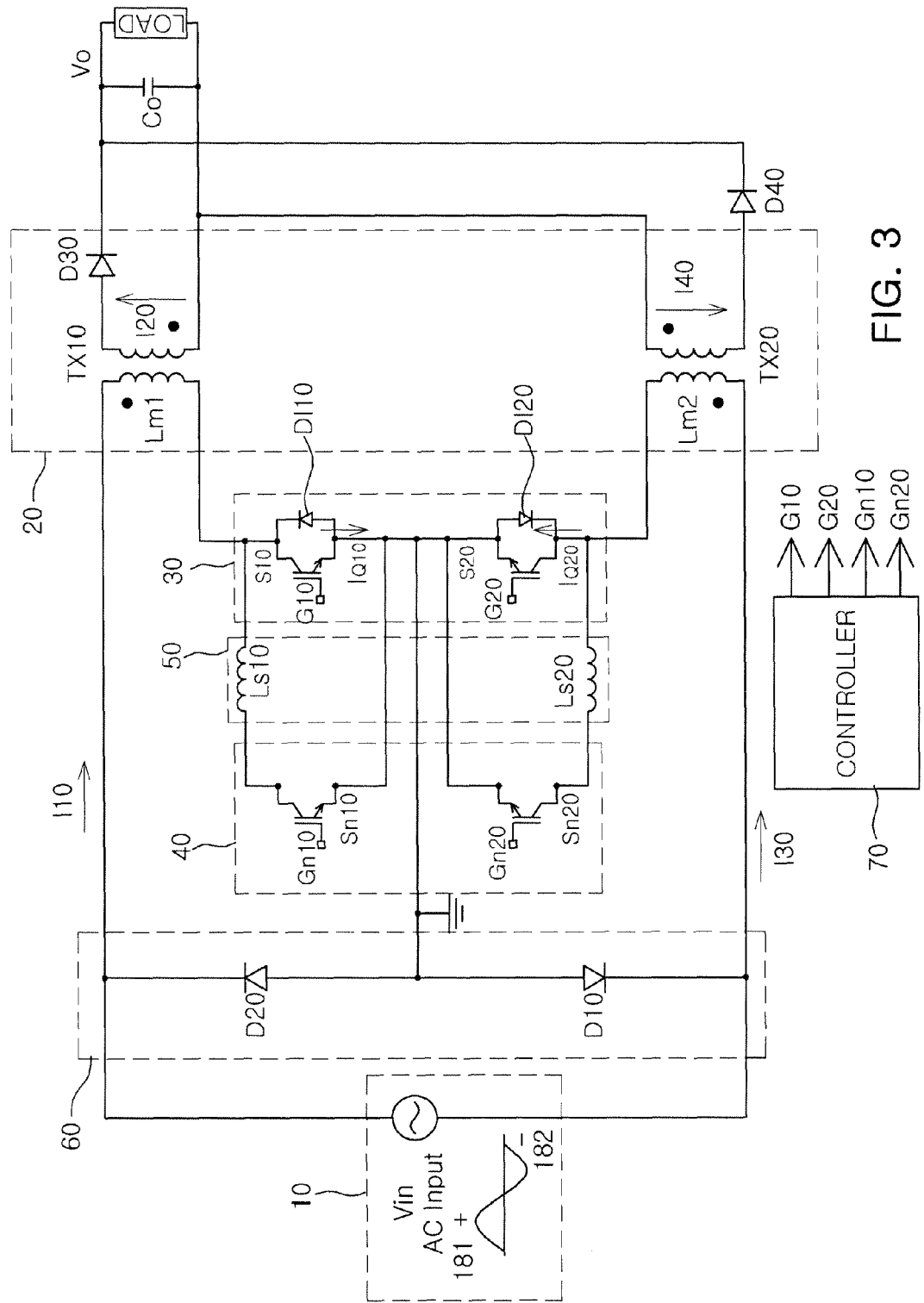
FIG. 3 is a circuit diagram of a power supply device according to an embodiment of the present invention.

FIG. 3 is a circuit diagram of a power supply device according to an embodiment of the present invention.

Referring to FIG. 3, the power supply device may include an AC power supply unit 10, a transformer unit 20, a main switch unit 30, an auxiliary switch unit 40, an auxiliary inductor unit 50, and a path providing unit 60.

The AC power supply unit 10 may supply AC power. That is, the AC power supply unit 10 may generate AC power through repetition of a positive half cycle 181 and a negative half cycle 182.

The transformer unit 20 includes a first transformer TX10 and a second transformer TX20. The first transformer TX10 may be connected to a positive (+) terminal of the AC power supply unit 10. The second transformer TX20 may be connected to a negative (−) terminal of the AC power supply unit 10.

The first transformer TX10 and the second transformer TX20 include a primary winding and a secondary winding, respectively.

The first transformer TX10 may be connected to one terminal of the AC power supply unit 10 and may transform a primary current I10 from the AC power supply unit 10 into a secondary current I20. Here, the primary current I10 may refer to a current flowing through a primary winding of the first transformer TX10 and the secondary current I20 may refer to a current flowing through a secondary winding of the first transformer TX10. In addition, the currents flowing through respective windings of the first transformer TX10 may be defined as a first current.

The second transformer TX20 may be connected to one terminal of the AC power supply unit 10 and may transform a primary current I30 from the AC power supply unit 10 into a secondary current I40. Here, the primary current I30 may refer to a current flowing through a primary winding of the second transformer TX20 and the secondary current I40 may refer to a current flowing through a secondary winding of the second transformer TX20. Alternatively, the currents flowing through respective windings of the second transformer TX20 may be defined as a second current.

The main switch unit 30 may control the currents flowing through the primary winding of the transformer unit 20. The power supply device may transfer energy of a primary side of the transformer unit 20 to a secondary side of the transformer unit 20 according to a switching operation of the main switch unit 30.

The main switch unit 30 may include a first main switch S10, and a second main switch S20.

The first main switch S10 may be connected to the primary winding of the first transformer TX10. The first main switch S10 may control the first primary current flowing through the primary winding of the first transformer TX10. According to switching of the first main switch S10, the power supply device may transfer energy of a primary side of the first transformer TX10 to a secondary side of the first transformer TX10.

The second main switch S20 may be connected to the primary winding of the second transformer TX20. The second main switch S20 may control the second primary current flowing through the primary winding of the second transformer TX20. According to switching of the second main switch S20, the power supply device may transfer energy of a primary side of the second transformer TX20 to a secondary side of the second transformer TX20.

According to an embodiment of the present invention, the first main switch S10 may be turned on during the positive half cycle 181. In this case, a low signal may be applied to the second main switch S20 to turn off the second main switch S20.

In addition, the second main switch S20 may be turned on during the negative half cycle 182. In this case, a low signal may be applied to the first main switch S10 to turn off the first main switch S10.

The first main switch S10 and the second main switch S20 may perform switching operations with a predetermined phase difference therebetween. For example, the first main switch S10 and the second main switch S20 may perform switching operations with an input phase difference of 180°.

In addition, the main switch unit 30 may include a first reverse current blocking diode DI10 and a second reverse current blocking diode DI20. The first reverse current blocking diode DI10 may block a reverse current of the first main switch S10.

The second reverse current blocking diode DI20 may block a reverse current of the second main switch S20.

When the first main switch S10 and the second main switch S20 are respectively configured of transistors, the first reverse current blocking diode DI10 and the second reverse current blocking diode DI20 may respectively be diodes formed on bodies, but are not limited thereto. Thus, the first reverse current blocking diode DI10 and the second reverse current blocking diode DI20 may respectively be separate diodes.

The path providing unit 60 may provide a conduction path based on power supplied from the AC power supply unit 10. The path providing unit 60 may include a first path diode D10 and a second path diode D20.

The first path diode D10 may be connected to one end of the first main switch S10.

According to an embodiment of the present invention, an anode of the first path diode D10 may be connected to one end of the first main switch S10 and a cathode of the first path diode D10 may be connected to the negative (−) terminal of the AC power supply unit 10. Thus, the first path diode D10 may be turned on during the positive half cycle 181.

The second path diode D20 may be connected to one end of the second main switch S20.

According to an embodiment of the present invention, an anode of the second path diode D20 may be connected to one end of the second main switch S20 and a cathode of the second path diode D20 may be connected to the positive (+) terminal of the AC power supply unit 10. Thus, the second path diode D20 may be turned on during the negative half cycle 182.

A first rectifier diode D30 may rectify the first secondary current I20 of the first transformer TX10 and may transfer the first secondary current I20 to an output unit. In addition, a second rectifier diode D40 may rectify the second secondary current I40 of the second transformer TX20 and may transfer the second secondary current I40 to the output unit.

The power supply device according to the present embodiment may include the capacitor element $C_O$ which stabilizes power. The capacitor element $C_O$ may stabilize the power transferred from the first rectifier diode D30 and the second rectifier diode D40.

The auxiliary switch unit 40 may form a transfer path for surplus power remaining during the switching operation of the main switch unit 30.

The auxiliary switch unit 40 may include a first auxiliary switch Sn10 and a second auxiliary switch Sn20. The first auxiliary switch Sn10 may be connected to the first main switch S10 in parallel. The second auxiliary switch Sn20 may be connected to the second main switch S20 in parallel.

The auxiliary inductor unit 50 may adjust the amount of current flowing through the auxiliary switch unit 40 during a switching operation of the auxiliary switch unit 40. For example, a first auxiliary inductor Ls10 may adjust the amount of current flowing through the first auxiliary switch Sn10 during a switching operation of the first auxiliary switch Sn10. In addition, a second auxiliary inductor Ls20 may adjust the amount of current flowing through the second auxiliary switch Sn20 during a switching operation of the second auxiliary switch Sn20.

A controller 70 may provide switching control signals G10, G20, Gn10, and Gn20 for controlling switching operations of the first main switch S10, the second main switch S20, the first auxiliary switch Sn10, and the second auxiliary switch Sn20.

Each of the first main switch S10, the second main switch S20, the first auxiliary switch Sn10, and the second auxiliary switch Sn20 may include one of an insulated gate bipolar transistor (IGBT), a metal oxide semiconductor field-effect transistor (MOS-FET), and a bipolar junction transistor (BJT).

Figure 4A:
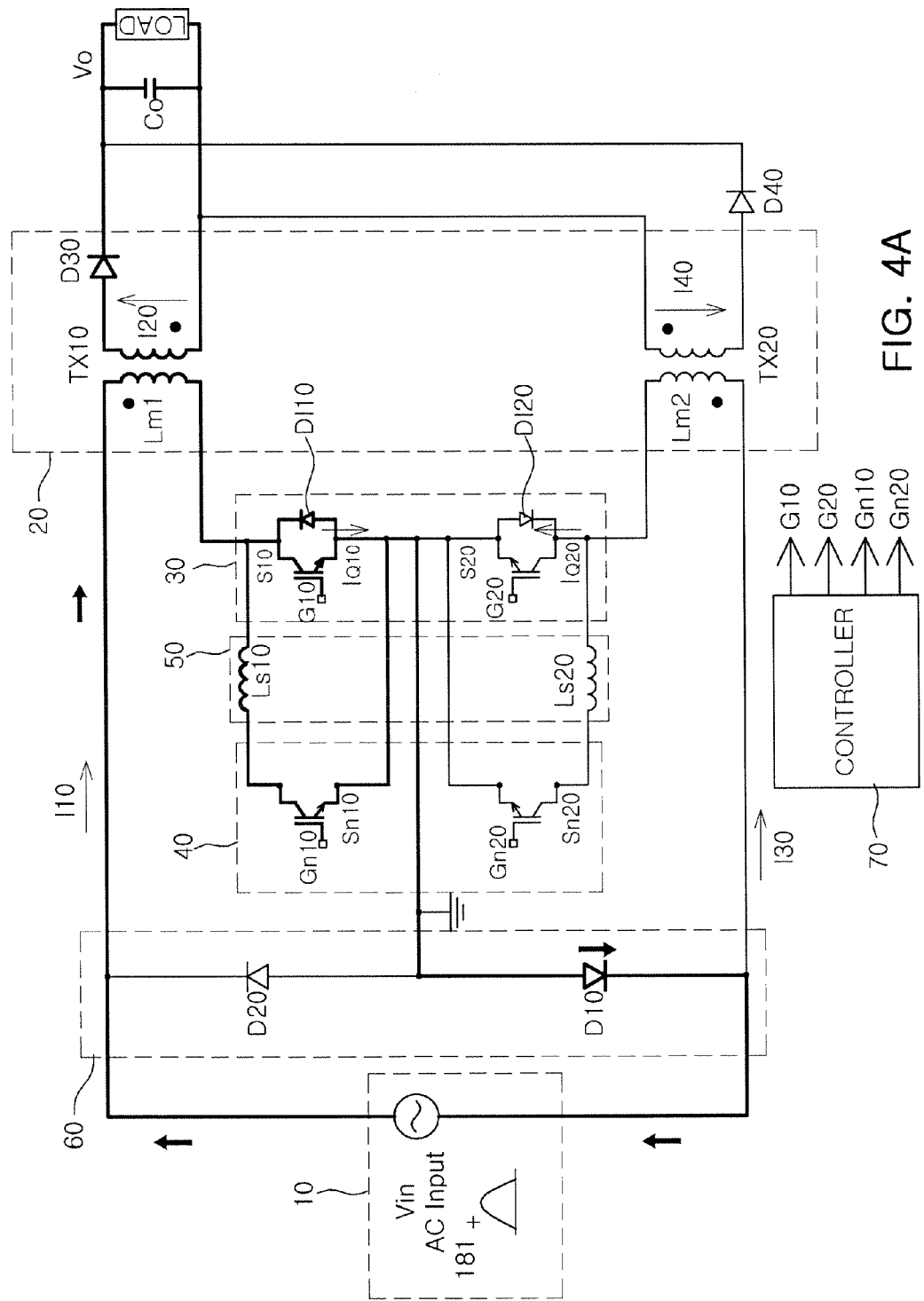
FIGS. 4A and 4B are diagrams showing a current flow and switching control signals in a positive half cycle.
Figure 4B:
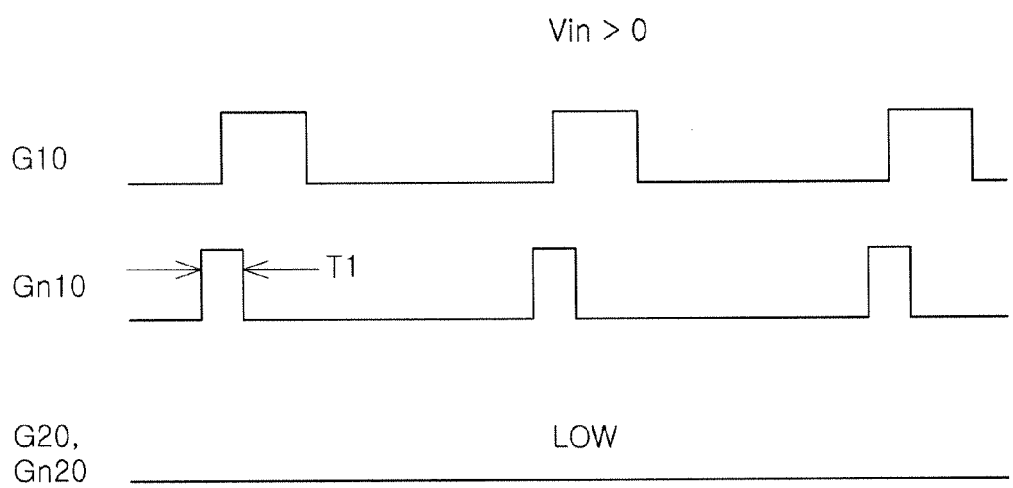

FIGS. 4A and 4B are diagrams showing a current flow and switching control signals in the positive half cycle.

FIG. 4A is a diagram illustrating a current flow in the positive half cycle. FIG. 4B is a diagram illustrating switching control signals in the positive half cycle.

Referring to FIG. 4, when the AC power supply unit 10 is in the positive half cycle 181, the controller 70 may apply low levels of the switching control signals G20 and Gn20 to the second main switch S20 and the second auxiliary switch Sn20. In addition, the controller 70 may apply predetermined pulse signals to the first main switch S10 and the first auxiliary switch Sn10.

That is, according to an embodiment of the present invention, when the AC power supply unit 10 is in the positive half cycle 181, the first main switch S10 and the first auxiliary switch Sn10 may be turned on and the second main switch S20 and the second auxiliary switch Sn20 may be turned off.

The AC power supply unit 10 may generate AC power through repetition of the positive half cycle 181 and the negative half cycle 182. In this case, when the positive half cycle 181 is maintained, the current flows through the first transformer TX10, the first main switch S10, and the first path diode D10.

Referring to FIGS. 4A and 4B, the auxiliary switch unit 40 of the power supply device according to an embodiment of the present invention may form the transfer path for surplus power before the main switch unit 30 is turned on. In other words, a zero voltage switching condition of the main switch unit 30 may be provided, thereby removing switching loss.

More specifically, in order to form the transfer path for the surplus power, the controller 70 may transfer the switching control signals G10 and Gn10 for turning on the first auxiliary switch Sn10 before the first main switch S10 is turned on.

More specifically, the first auxiliary switch Sn10 may form the transfer path for the surplus power present before the first main switch S10 is turned on.

To this end, as shown in FIGS. 4A and 4B, the first auxiliary switch Sn10 may be turned on before the first main switch S10 is turned on, and may be turned off before the first main switch S10 is turned off, which may be referred to as a first switching operation.

When the first auxiliary switch Sn10 forms the transfer path for the surplus power of the first main switch S10, switching loss of the first main switch S10 may be reduced, but switching loss of the first auxiliary switch Sn10 may be generated.

In other words, at a time at which the first auxiliary switch Sn10 is turned off, a peak voltage may be generated in both ends of the first auxiliary switch Sn10 due to transient power, and thus, switching loss may be generated.

In order to address the defect, referring to FIGS. 4A and 4B, the power supply device according to an embodiment of the present invention may further include the first auxiliary inductor Ls10 for adjusting the amount of current flowing through the first auxiliary switch Sn10 during the switching operation of the first auxiliary switch Sn10.

Referring to FIGS. 4A and 4B, a width T1 of the switching control signal Gn10 for the first auxiliary switch Sn10 may be appropriately adjusted. The width T1 may be determined according to switching operation characteristics, a gate voltage level, gate resistance, inductance of the auxiliary inductor, and the like. For example, the pulse width T1 of the control signal Gn10 may generate a zero voltage switching condition of the first main switch S10.

Likewise, according to an embodiment of the present invention, since the first main switch S10 operates in the zero voltage switching condition, switching loss of the first main switch S10 may be reduced. Thus, efficiency of the power supply device may largely increase.

Figure 5A:
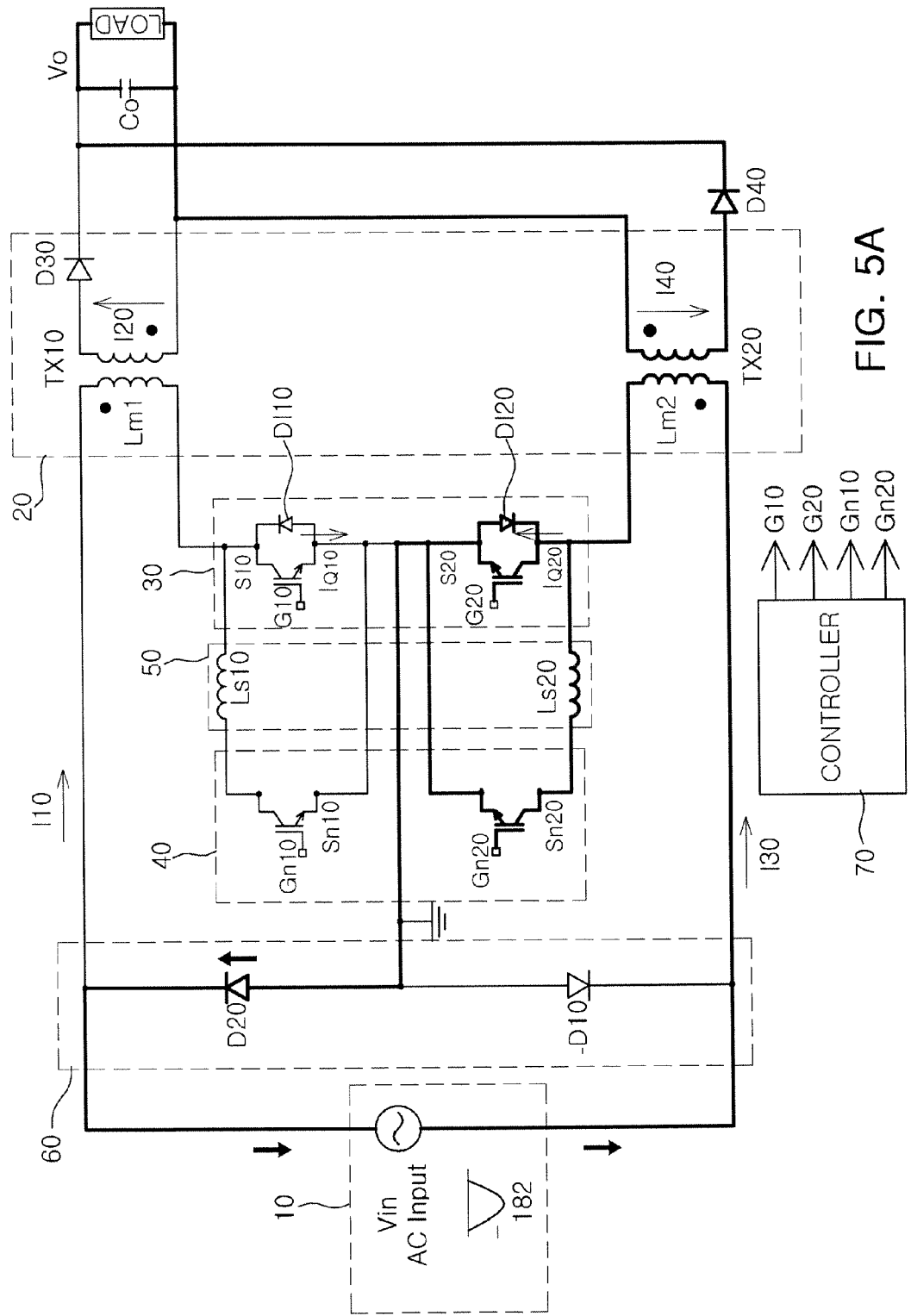
FIGS. 5A and 5B are diagrams showing a current flow and switching control signals in a negative half cycle.
Figure 5B:
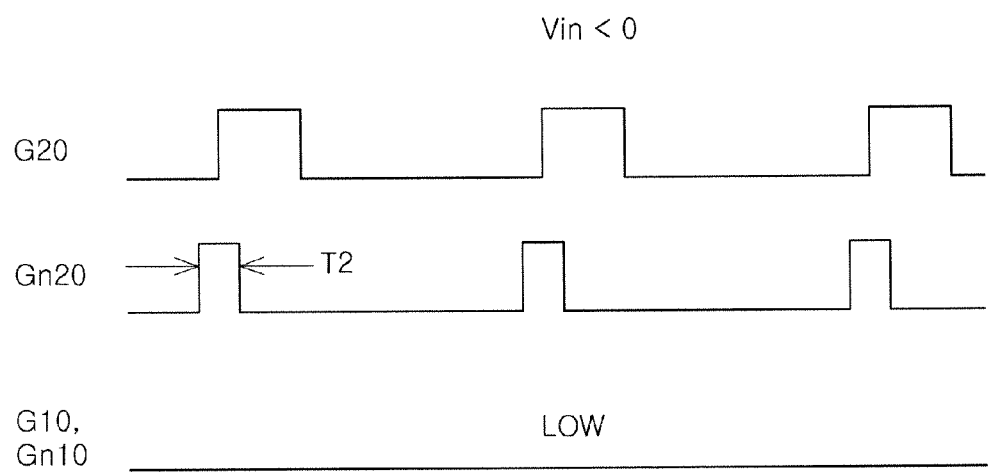

FIGS. 5A and 5B are diagrams showing a current flow and switching control signals in the negative half cycle.

FIG. 5A is a diagram illustrating a current flow in the negative half cycle. FIG. 5B is a diagram illustrating the switching control signals in the negative half cycle.

Referring to FIGS. 5A and 5B, when the AC power supply unit 10 is in the negative half cycle 182, the controller 70 may apply Low signals of the switching control signals G10 and Gn10 to the first main switch S10 and the first auxiliary switch Sn10. In addition, the controller 70 may apply predetermined pulse signals to the second main switch S20 and the second auxiliary switch Sn20.

That is, according to an embodiment of the present invention, when the AC power supply unit 10 is in the negative half cycle 182, the second main switch S20, and the second auxiliary switch Sn20 may be turned on and the first main switch S10 and the first auxiliary switch Sn10 may be turned off.

The AC power supply unit 10 may generate AC power through repetition of the positive half cycle 181 and the negative half cycle 182. In this case, when the negative half cycle 182 is maintained, the current flows through the second transformer TX20, the second main switch S20, and the second path diode D20.

Referring to FIGS. 5A and 5B, the auxiliary switch unit 40 of the power supply device according to an embodiment of the present invention may form the transfer path for surplus power before the main switch unit 30 is turned on. In other words, the zero voltage switching condition of the main switch unit 30 may be provided, thereby removing switching loss.

In detail, in order to form the transfer path for the surplus power, the controller 70 may transfer the switching control signals G20 and Gn20 for turning on the second auxiliary switch Sn20 before the second main switch S20 is turned on.

In detail, the second auxiliary switch Sn20 may form the transfer path for the surplus power present before the second main switch S20 is turned on.

To this end, as shown in FIGS. 5A and 5B, the second auxiliary switch Sn20 may be turned on before the second main switch S20 is turned on, and may be turned off before the second main switch S20 is turned off, which may be referred to as a second switching operation.

When the second auxiliary switch Sn20 forms the transfer path for the surplus power of the second main switch S20, switching loss of the second main switch S20 may be reduced, but switching loss of the second auxiliary switch Sn20 may be generated.

In other words, at a time at which the second auxiliary switch Sn20 is turned off, a peak voltage may be generated at both ends of the second auxiliary switch Sn20 due to transient power, and thus, switching loss may be generated.

In order to address the defect, referring to FIGS. 5A and 5B, the power supply device according to an embodiment of the present invention may further include the second auxiliary inductor Ls20 for adjusting the amount of current flowing through the second auxiliary switch Sn20 during a switching operation of the second auxiliary switch Sn20.

Referring to FIGS. 5A and 5B, a width T2 of the switching control signal Gn20 of the second auxiliary switch Sn20 may be appropriately adjusted. The width T2 may be determined according to switching operation characteristics, a gate voltage level, gate resistance, inductance of the auxiliary inductor, and the like. For example, the pulse width T2 of the control signal Gn20 may generate a zero voltage switching condition of the second main switch S20.

Likewise, according to an embodiment of the present invention, since the second main switch S20 operates in the zero voltage switching condition, switching loss of the second main switch S20 may be reduced. Thus, efficiency of the power supply device may largely increase.

Figure 6:
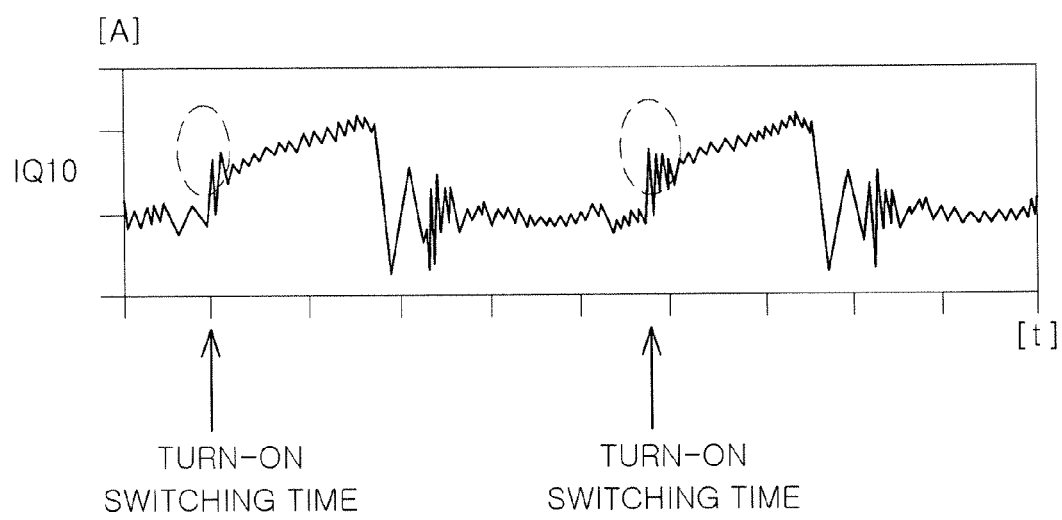
FIG. 6 is a waveform diagram of a current flowing through a first main switch of the power supply device according to an embodiment of the present invention.

FIG. 6 is a waveform diagram of a current flowing through the first main switch S10 of the power supply device according to an embodiment of the present invention.

Comparing current waveforms of FIGS. 2 and 6, as seen from FIG. 6, according to the present embodiment, a spike current is largely reduced.

Referring to FIG. 6, the power supply device according to the present embodiment may reduce the switching loss of the first main switch S10, may reduce stress of the first main switch S10, and may reduce an EMI noise level generated in the converter.

Figure 7:
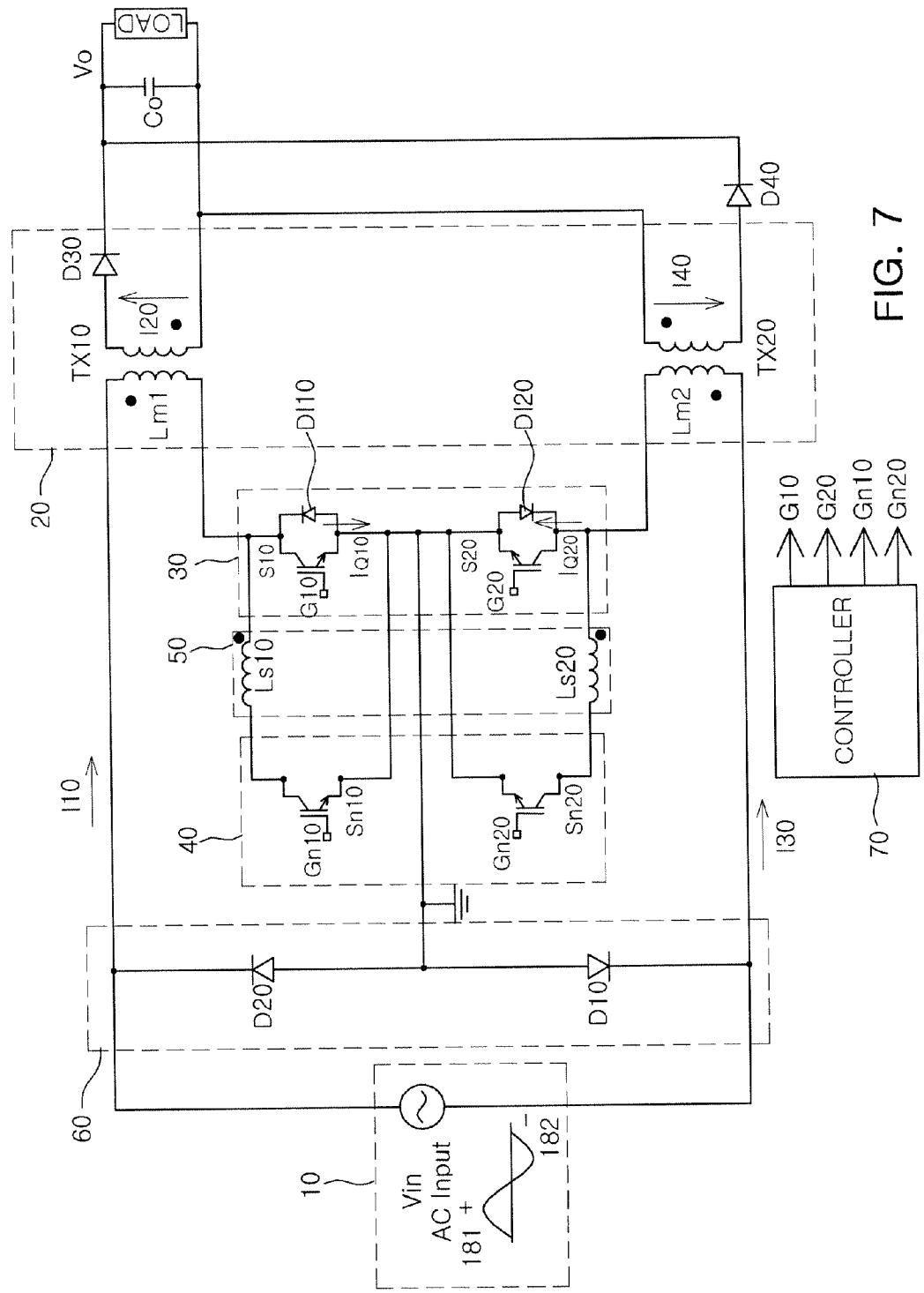
FIG. 7 is a circuit diagram of a power supply device according to another embodiment of the present invention.

FIG. 7 is a circuit diagram of a power supply device according to another embodiment of the present invention.

Referring to FIG. 7, the first auxiliary inductor Ls10 and the primary winding of the first transformer TX10 may be inductively coupled to each other. In addition, the second auxiliary inductor Ls20 and the primary winding of the second transformer TX20 may be inductively coupled to each other.

The first auxiliary inductor Ls10 and the first transformer TX10 may have a single core shared therebetween. In addition, the second auxiliary inductor Ls20 and the second transformer TX20 may have a single core shared therebetween.

The core may be a magnetic core. The magnetic core may be an iron core or a ferrite core.

According to an embodiment of the present invention, at a time at which the first and second auxiliary switches Sn10 and Sn20 are switched off, energy stored in the auxiliary inductors Ls10 and Ls20 may be transferred to the first and second transformers TX10 and TX20.

Likewise, due to energy coupling of the first and second auxiliary inductors Ls10 and Ls20 and the first and second transformers TX10 and TX20, the spike voltage may be limited to have a low value.

According to an embodiment of the present invention, since energy of the auxiliary inductor may be recycled through the coupled core at a time at which the auxiliary switch is turned off by inductively coupling the auxiliary inductor and the transformer to each other, thereby additionally increasing efficiency of the converter and reducing EMI noise.

As set forth above, according to the embodiments of the present invention, the power supply device capable of transferring surplus power to the ground prior to switching for power conversion, thereby reducing switching loss generated during the switching, can be provided.

In addition, according to the embodiments of the present invention, the power supply device capable of reducing an EMI noise level can be provided.

While the present invention has been shown and described in connection with the embodiments, it will be apparent to those skilled in the art that modifications and variations can be made without departing from the spirit and scope of the invention as defined by the appended claims.

What is claimed is:

1. A power supply device, comprising:
   an alternating current (AC) power supply unit supplying a first primary current in a positive half cycle and supplying a second primary current in a negative half cycle;
   a transformer unit including a first transformer transforming the first primary current from the AC power supply unit into a first secondary current, and a second transformer transforming the second primary current from the AC power supply unit into a second secondary current;
   a main switch unit including a first main switch controlling the first primary current flowing through a primary winding of the first transformer, and a second main switch controlling the second primary current flowing through a primary winding of the second transformer;
   an auxiliary switch unit including a first auxiliary switch forming a transfer path for surplus power present before the first main switch is turned on, and a second auxiliary switch forming a transfer path for surplus power present before the second main switch is turned on;
   an auxiliary inductor unit including a first auxiliary inductor adjusting an amount of current flowing through the first auxiliary switch during a switching operation of the first auxiliary switch, and a second auxiliary inductor adjusting an amount of current flowing through the second auxiliary switch during a switching operation of the second auxiliary switch; and
   a path providing unit providing a conduction path based on power supplied from the AC power supply unit.

2. The power supply device of claim 1, wherein the path providing unit includes:
   a first path diode turned on during the positive half cycle; and a second path diode turned on during the negative half cycle.

3. The power supply device of claim 2, wherein the first path diode is formed between the first main switch and a negative terminal of the AC power supply unit, and the second path diode is formed between the second main switch and a positive terminal of the AC power supply unit.

4. The power supply device of claim 1, further comprising:
a first rectifier diode rectifying and outputting the first secondary current of the first transformer; and
a second rectifier diode rectifying and outputting the second secondary current of the second transformer.

5. The power supply device of claim 4, further comprising a capacitor element stabilizing power transferred from the first rectifier diode and the second rectifier diode.

6. The power supply device of claim 1, wherein the first auxiliary switch is turned on before the first main switch is turned on, and the first auxiliary switch is turned off before the first main switch is turned off so as to perform a first switching operation.

7. The power supply device of claim 1, wherein the second auxiliary switch is turned on before the second main switch is turned on, and the second auxiliary switch is turned off before the second main switch is turned off so as to perform a second switching operation.

8. The power supply device of claim 1, wherein the first main switch and second main switch of the main switch unit perform switching operations with an input phase difference of 180°.

9. The power supply device of claim 1, wherein the first auxiliary inductor and the primary winding of the first transformer are inductively coupled to each other, and the second auxiliary inductor and the primary winding of the second transformer are inductively coupled to each other.

10. The power supply device of claim 1, further comprising a magnetic core shared by the first auxiliary inductor and the first transformer.

11. A power supply device, comprising:
an alternating current (AC) power supply unit supplying a first primary current in a positive half cycle and supplying a second primary current in a negative half cycle;
a first transformer connected between a positive terminal of the AC power supply unit and transforming the first primary current from the AC power supply unit into a first secondary current;
a second transformer connected to a negative terminal of the AC power supply unit and transforming the second primary current from the AC power supply unit into a second secondary current;
a first main switch controlling the first primary current flowing through a primary winding of the first transformer;
a second main switch performing a switching operation with a predetermined phase difference with the first main switch and controlling the second primary current flowing through a primary winding of the second transformer;
an auxiliary switch unit including a first auxiliary switch forming a transfer path for surplus power present before the first main switch is turned on, and a second auxiliary switch forming a transfer path for surplus power present before the second main switch is turned on;
an auxiliary inductor unit including a first auxiliary inductor adjusting an amount of current flowing through the first auxiliary switch during a switching operation of the first auxiliary switch, and a second auxiliary inductor adjusting an amount of current flowing through the second auxiliary switch during a switching operation of the second auxiliary switch; and
a path providing unit providing a conduction path based on power supplied from the AC power supply unit.

12. The power supply device of claim 11, wherein the path providing unit includes:
a first path diode turned on during the positive half cycle; and
a second path diode turned on during the negative half cycle.

13. The power supply device of claim 12, wherein the first path diode is formed between the first main switch and a negative terminal of the AC power supply unit, and
the second path diode is formed between the second main switch and a positive terminal of the AC power supply unit.

14. The power supply device of claim 11, further comprising:
a first rectifier diode rectifying and outputting the first secondary current of the first transformer; and
a second rectifier diode rectifying and outputting the second secondary current of the second transformer.

15. The power supply device of claim 14, further comprising a capacitor element stabilizing power transferred from the first rectifier diode and the second rectifier diode.

16. The power supply device of claim 11, wherein the first auxiliary switch is turned on before the first main switch is turned on, and the first auxiliary switch is turned off before the first main switch is turned off so as to perform a first switching operation.

17. The power supply device of claim 11, wherein the second auxiliary switch is turned on before the second main switch is turned on, and the second auxiliary switch is turned off before the second main switch is turned off so as to perform a second switching operation.

18. The power supply device of claim 11, wherein the first main switch and second main switch of the main switch unit perform switching operations with an input phase difference of 180°.

19. The power supply device of claim 11, wherein the first auxiliary inductor and the primary winding of the first transformer are inductively coupled to each other, and the second auxiliary inductor and the primary winding of the second transformer are inductively coupled to each other.

20. The power supply device of claim 11, further comprising a magnetic core shared by the first auxiliary inductor and the first transformer.

* * * * *